United States Patent
Kurita et al.

(10) Patent No.: US 12,472,820 B2
(45) Date of Patent: Nov. 18, 2025

(54) DISPLAY DEVICES

(71) Applicant: MITSUI CHEMICALS, INC., Tokyo (JP)

(72) Inventors: Hayato Kurita, Ichihara (JP); Kan Komiya, Tokyo (JP)

(73) Assignee: MITSUI CHEMICALS, INC., Tokyo (JP)

( * ) Notice: Subject to any disclaimer, the term of this patent is extended or adjusted under 35 U.S.C. 154(b) by 723 days.

(21) Appl. No.: 17/760,949

(22) PCT Filed: Sep. 14, 2020

(86) PCT No.: PCT/JP2020/034628
§ 371 (c)(1),
(2) Date: Mar. 16, 2022

(87) PCT Pub. No.: WO2021/054271
PCT Pub. Date: Mar. 25, 2021

(65) Prior Publication Data
US 2022/0332927 A1    Oct. 20, 2022

(30) Foreign Application Priority Data

Sep. 20, 2019   (JP) ................................. 2019-171778

(51) Int. Cl.
| | | |
|---|---|---|
| B60K 35/22 | (2024.01) | |
| B60K 35/29 | (2024.01) | |
| B60K 35/60 | (2024.01) | |
| C08J 5/18 | (2006.01) | |
| C08L 23/08 | (2025.01) | |
| C08L 23/0807 | (2025.01) | |
| C08L 25/10 | (2006.01) | |
| C08L 53/02 | (2006.01) | |
| C08L 83/04 | (2006.01) | |
| G02F 1/1333 | (2006.01) | |
| B60K 35/50 | (2024.01) | |

(52) U.S. Cl.
CPC .............. *B60K 35/22* (2024.01); *B60K 35/29* (2024.01); *B60K 35/60* (2024.01); *C08J 5/18* (2013.01); *C08L 23/0815* (2013.01); *C08L 25/10* (2013.01); *C08L 53/02* (2013.01); *C08L 53/025* (2013.01); *C08L 83/04* (2013.01); *G02F 1/133368* (2021.01); *B60K 35/50* (2024.01); *B60K 2360/28* (2024.01); *C08L 2205/03* (2013.01); *C08L 2207/04* (2013.01)

(58) Field of Classification Search
CPC .......... C08L 23/0815; C08L 2205/03
See application file for complete search history.

(56) References Cited

U.S. PATENT DOCUMENTS

| | | | |
|---|---|---|---|
| 8,722,752 B2 | 5/2014 | Kuwamura et al. | |
| 9,096,748 B2 | 8/2015 | Eguchi et al. | |
| 9,796,824 B2 | 10/2017 | Kuwamura et al. | |
| 10,227,468 B2 | 3/2019 | Kuwamura et al. | |
| 2002/0195910 A1* | 12/2002 | Hus ........................ | G06F 1/1626 312/223.2 |
| 2006/0154038 A1* | 7/2006 | Kanae ..................... | B32B 25/04 525/196 |
| 2006/0272771 A1 | 12/2006 | Suzuki et al. | |
| 2008/0217821 A1 | 9/2008 | Goring et al. | |
| 2009/0192250 A1* | 7/2009 | Ijichi ..................... | C08L 53/025 524/505 |
| 2010/0216905 A1 | 8/2010 | Kuwamura et al. | |
| 2013/0209787 A1 | 8/2013 | Eguchi et al. | |
| 2013/0324631 A1 | 12/2013 | Kuwamura et al. | |
| 2015/0291758 A1 | 10/2015 | Kuwamura et al. | |
| 2017/0183443 A1 | 6/2017 | Kuwamura et al. | |
| 2023/0211666 A1* | 7/2023 | Honmatsu ............... | G06F 3/044 |

FOREIGN PATENT DOCUMENTS

| | | |
|---|---|---|
| JP | 3021005 U | 2/1996 |
| JP | 2005-023315 A | 1/2005 |
| JP | 2006-095966 A | 4/2006 |
| JP | 2009-517240 A | 4/2009 |
| JP | 2010-215684 A | 9/2010 |
| JP | 4900877 B2 | 3/2012 |
| JP | 5401320 B2 | 1/2014 |
| JP | 2017-177742 A | 10/2017 |
| JP | 2018-144511 A | 9/2018 |
| WO | WO-2011/155571 A1 | 12/2011 |

OTHER PUBLICATIONS

ISO 868, "Plastics and ebonite—Determination of indentation hardness by means of a durometer (Shore hardness)", International Standard, Third edition, Mar. 1, 2003, 10 pages.

* cited by examiner

*Primary Examiner* — Marc S Zimmer
(74) *Attorney, Agent, or Firm* — Foley & Lardner LLP

(57) ABSTRACT

A display device that includes a display element including a light source, and a surface film disposed so as to overlap with the display element and including a thermoplastic elastomer composition, the thermoplastic elastomer composition satisfying conditions (1) and (2) below, and the surface film satisfying conditions (3) and (4) below: (1) The melt flow rate (ASTM D1238, 230° C., 2.16 kg load; MFR) is not less than 30 g/10 min. (2) The type A hardness (momentary value) measured by a method in accordance with JIS K6253 is 60 to 90. (3) The thickness is not less than 300 μm and not more than 2 mm. (4) The total light transmittance measured by a method in accordance with JIS K7361 is 3 to 60%.

10 Claims, 2 Drawing Sheets

DISPLAY DEVICES

CROSS-REFERENCE TO RELATED APPLICATIONS

The present application claims priority under 37 U.S.C. § 371 to International Patent Application No. PCT/JP2020/034628, filed Sep. 14, 2020, which claims priority to and the benefit of Japanese Patent Application No 2019-171778, filed on Sep. 20, 2019. The contents of these applications are hereby incorporated by reference in their entireties.

TECHNICAL FIELD

The present invention relates to display devices.

BACKGROUND ART

Decorative panels having a leather-like appearance are often used in interiors such as automobile cabins to give an upscale image. Meanwhile, recent automobiles are provided with various display devices and functional parts on instrument panels ahead driver's seats. Such display devices and operation sections that are provided are wide-ranging and include, for example, conventional gauging instruments such as speedometers, tachometers and fuel gauges, switches such as air conditioner switches, window opening/closing switches and door locks, display sections and operation sections of car navigation systems, external monitors, lighting and decorations. These display sections and operation sections occupy a very large area particularly around a driver's seat and a front passenger seat, and a sufficient upscale image or sufficient decorative effects are hardly obtained even when a leather-like decorative panel or the like is used as described above.

A sense of luxury is also sought in the inside of buildings (such as office buildings, hotels, stores and general houses) by the use of upscale wall materials or the like. However, the upscale appearance or decorative effects of wall materials are sometimes impaired by the presence of a large number of displays, operation sections thereof and other equipment that are placed indoors.

Patent Literature 1 discloses an invention in which a translucent urethane synthetic leather is applied over a wide area including a display region provided with light-emitting elements, and thereby display sections and operation sections are rendered visible during illumination periods and are all hidden during non-illumination times by the surface of the leather pattern of the translucent urethane synthetic leather. Patent Literature 2 discloses a durable polyurethane resin that is not aromatic.

The invention described in Patent Literature 1 uses a translucent urethane synthetic leather but is silent with respect to any specific configuration of the leather. It is therefore difficult to actually render display sections and operation sections visible during illumination periods and invisible during non-illumination times. Further, no considerations are made on the touch and durability of the translucent urethane synthetic leather, and the teaching may mislead to a touch which lacks a sense of luxury or to a poor appearance due to deterioration of the translucent urethane synthetic leather with time.

Patent Literature 3 discloses a display device which attains high decorative effects without impairing, that is, while maintaining various functions such as touch of display sections and operation sections. This display device includes a display element including a light source, and a surface film disposed so as to overlap with the display element, the surface film having a thickness of not less than 300 μm and not more than 2 mm and a total light transmittance of not less than 3% and not more than 60%.

CITATION LIST

Patent Literature

Patent Literature 1: Japanese Patent No. 4900877
Patent Literature 2: Japanese Patent No. 5401320
Patent Literature 3: JP-A-2018-144511

SUMMARY OF INVENTION

Technical Problem

The conventional display devices described above are designed so that display sections and operation sections will be visible during illumination periods and will be invisible during non-illumination times. Thus, the display sections and the operation sections are substantially unperceivable during non-illumination times. However, actual operators may encounter troubles if the positions of operation sections such as operation switches cannot be perceived during non-illumination times. Thus, the finding is that the perceptibility of display sections and operation sections is demanded even in circumstances where the display devices do not emit light and the display sections and the operation sections are invisible.

An object of the present invention is to provide a display device that has functions such as touch comparable to the existing display devices and allows a display section or an operation section to be perceived even in circumstances where the display device does not emit light and the display section or the operation section is invisible.

Solution to Problem

The present inventors assumed that display sections and operation sections would be rendered perceivable by, for example, providing steps on the display sections and the operation sections, and have successfully developed a display device suitable for the provision of such steps.

Specifically, the present invention pertains to, for example, the following [1] to [11]:

[1] A display device comprising a display element including a light source, and a surface film disposed so as to overlap with the display element and comprising a thermoplastic elastomer composition, the thermoplastic elastomer composition satisfying conditions (1) and (2) below, the surface film satisfying conditions (3) and (4) below:

(1) the melt flow rate (ASTM D1238, 230° C., 2.16 kg load; MFR) is not less than 30 g/10 min;

(2) the type A hardness (momentary value) measured by a method in accordance with JIS K6253 is 60 to 90;

(3) the thickness is not less than 300 μm and not more than 2 mm;

(4) the total light transmittance measured by a method in accordance with JIS K7361 is 3 to 60%.

[2] The display device described in [1], wherein the thermoplastic elastomer composition is a thermoplastic elastomer composition comprising components (A) to (C) below:

(A) an ethylene/α-olefin copolymer comprising ethylene units and C3-C20 α-olefin units;

(B) a hydrogenated product of a block copolymer comprising at least one block principally comprising conjugated diene monomer units and at least one block principally comprising vinyl aromatic monomer units; and (C) an olefin resin other than the component (A).

[3] The display device described in [2], wherein the mass ratio ((A)/(B)) of the component (A) to the component (B) is 20/80 to 75/25, and the content of the component (C) is 20 to 150 parts by mass relative to the total of the contents of the component (A) and the component (B) taken as 100 parts by mass.

[4] The display device described in any of [1] to [3], wherein the thermoplastic elastomer composition is a cross-linked thermoplastic elastomer composition.

[5] The display device described in any of [1] to [4], wherein the thermoplastic elastomer composition further comprises a softener (D).

[6] The display device described in any of [1] to [5], wherein the thermoplastic elastomer composition further comprises a polyorganosiloxane (E).

[7] The display device described in any of [1] to [6], wherein the surface film is obtained by injection molding the thermoplastic elastomer composition.

[8] The display device described in any of [1] to [7], wherein the surface film is grained with irregularities including larger irregularities having a height difference of 20 μm to 500 μm and smaller irregularities having a height difference of 1 μm to 10 μm.

[9] The display device described in any of [1] to [8], wherein the surface film has a step at a position where the display element is attached.

[10] The display device described in any of [1] to [9], wherein the surface film has a specular gloss at 60° of not more than 5% as measured by a method in accordance with JIS 28741.

[11] A vehicle interior member comprising the display device of any of [1] to [10] that is incorporated in the vehicle interior member.

Advantageous Effects of Invention

The display device of the present invention attains an excellent appearance and a good touch offered by the surface film, and can display clearly visible images during illumination periods. During non-illumination times, the display element is not conspicuous and the surface film can fully exhibit its good appearance (decorative effects). Further, for example, steps may be provided on display sections and operation sections to allow the display sections and the operation sections to be tactually perceived even in circumstances where the display devices do not emit light and the display sections and the operation sections are invisible. Such steps may be easily formed by, for example, injection molding of the thermoplastic elastomer composition.

DESCRIPTION OF EMBODIMENTS

A display device of the present invention includes a display element including a light source, and a surface film disposed so as to overlap with the display element and including a thermoplastic elastomer composition.

Figure 1:
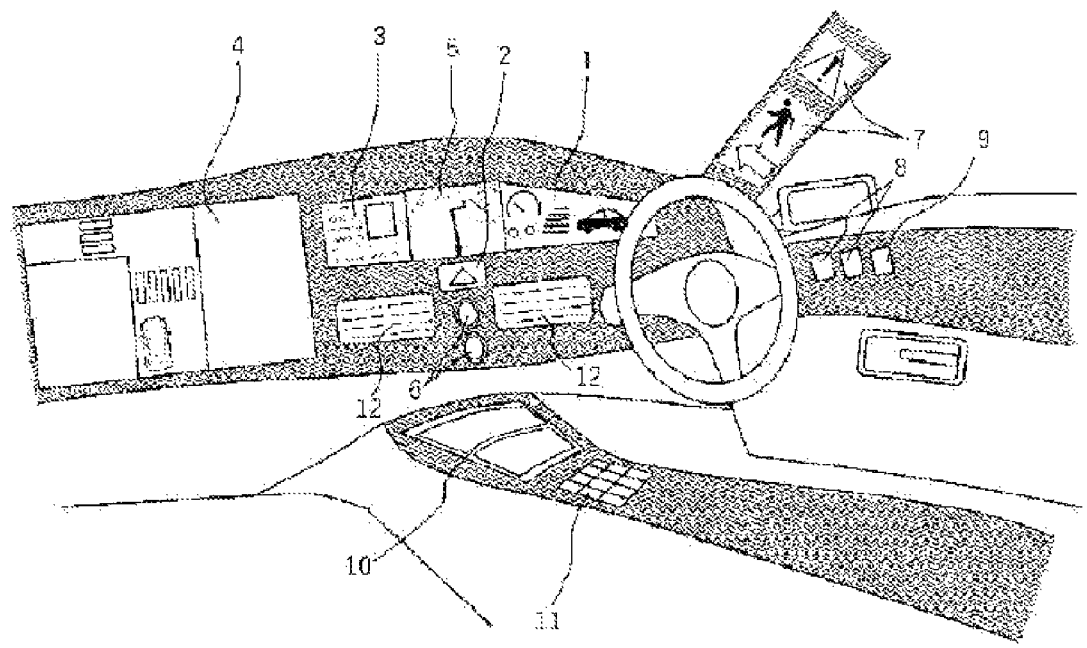
FIG. 1 is a schematic view illustrating the interior of a cabin including a display device according to an embodiment of the present invention in which the display device is luminous.
Figure 2:
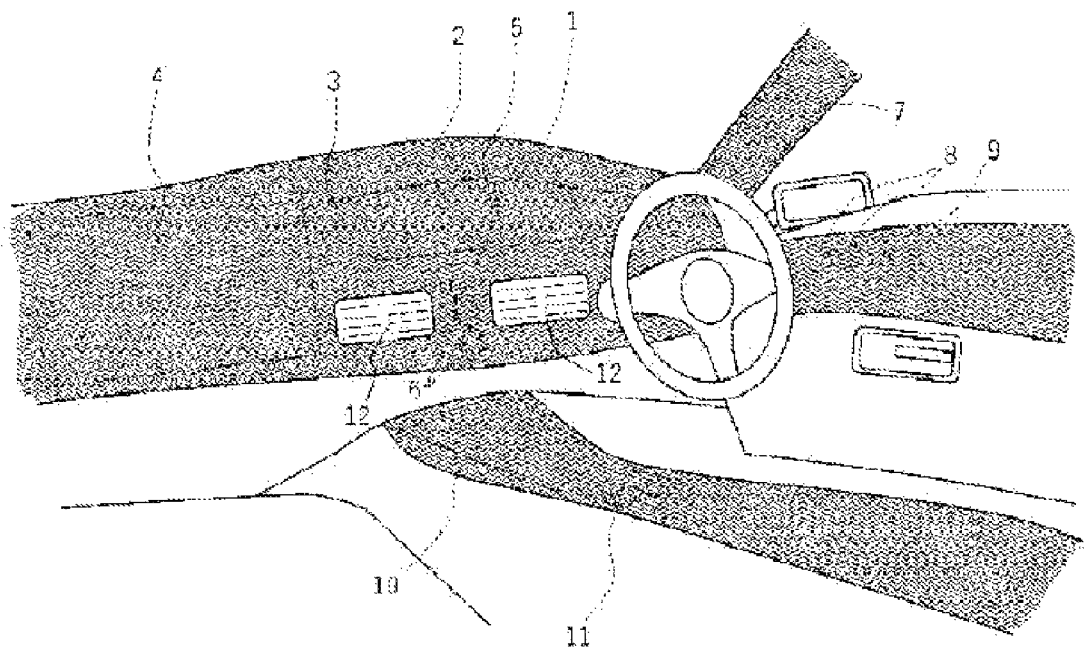
FIG. 2 is a schematic view illustrating the interior of the cabin shown in FIG. 1 in which the display device is not luminous.

FIGS. 1 and 2 are schematic views illustrating the interior of an automobile cabin that includes display devices according to an embodiment of the present invention. The display devices of the present invention are adopted in a wide area (almost the entirety) of a dashboard (an instrument panel) disposed in front of a driver's seat and a front passenger seat. Specifically, in the example illustrated in FIGS. 1 and 2, the display devices of the present invention are adopted in a vehicle data display section 1 including a speedometer and a tachometer, a car navigation system display section (which may be a touch panel serving as a display section and an operation section) 2, a received data display section (which may be an Internet terminal) 3 that displays information received such as the latest news, weather forecasts, traffic conditions and other images, a monitor 4 that displays video images, a hazard lamp switch 5, and air conditioner switches 6 (in FIGS. 1 and 2, air outlets 12 of the air conditioner are illustrated). The monitor 4 displays video images of the outside of the vehicle and is also used as a television receiver. Further, the display devices of the present invention are adopted in warning display sections 7 provided in a pillar, window opening/closing switches 8 and a door lock switch 9 provided on a door, and a decorative and lighting panel 10 and an operation panel 11 provided on a console. The warning display sections 7 notify the driver of an abnormality or danger detected by a sensor or the like. The decorative and lighting panel 10 is used as indirect lighting or luminous decoration. The operation panel 11 is composed of remote switches for performing locking of the doors and opening/closing of the windows from the driver's seat. These display devices employ the technique of the display devices of the present invention. As illustrated in FIG. 1, the display sections and the operation sections are clearly displayed and are visually perceivable during illumination periods. On the other hand, as illustrated in FIG. 2, the display sections and the operation sections are not visually recognized through the surface film during non-illumination times.

Figure 3:
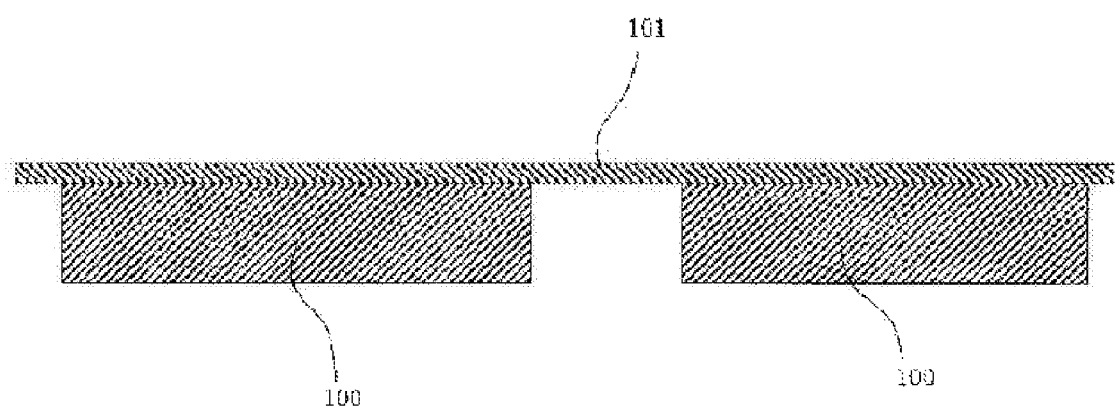
FIG. 3 is a sectional view schematically illustrating a configuration of a display device of the present invention.

As illustrated in FIG. 3, the display devices of the present embodiment that are adopted in many sections in the cabin shown in FIGS. 1 and 2 have a configuration in which a surface film (sheet) 101 overlaps with the surface of display elements 100 each including a light source. When a large number of the display devices are provided as illustrated in FIG. 1, the surface film 101 may be shared as illustrated in FIG. 3. Specifically, display elements 100 may be attached to locations on the backside (the side that is not exposed to the outside) of a surface film 101 having a large area. In this manner, a seamless good appearance may be obtained, and costs may be reduced while facilitating the production and enhancing the efficiency. The display element 100 including a light source is not particularly limited and may have a conventionally known configuration, with examples including liquid crystal elements, electroluminescence elements and LEDs.

The surface film of the present invention satisfies the following conditions (3) and (4).

(3) The thickness is not less than 300 μm and not more than 2 mm.

To ensure that a display formed by the light source will be seen, the thickness of the surface film of the present invention is not less than 300 µm and not more than 2 mm. If the film is too thick, the light source cannot be seen. If the thickness is too small, the underlying device is seen through the film. The thickness of the surface film of the present invention is preferably not less than 300 µm and not more than 1.5 mm, and more preferably not less than 300 µm and not more than 1.0 mm.

(4) The total light transmittance measured by a method in accordance with JIS K7361 is 3 to 60%.

If the total light transmittance is too high, the underlying device is seen through the film. If the total light transmittance is too low, the film does not transmit the light from the light source and fails to allow an operation switch to be perceived. Thus, the total light transmittance of the surface film of the present invention is 3 to 60%, preferably 3 to 50%, and more preferably 3 to 40%.

The surface film of the present invention may have a step at a position where the display element is attached. The term "step" means a tactually perceivable difference in height from surroundings. The concept of step is different from that of irregularities on the surface of the surface film which will be described later. The "position where the display element is attached" is, as illustrated in FIG. 3, a position on the surface film 101 at which the display device 100 is disposed under the surface film 101 and which corresponds to a display section or an operation section such as an operation switch of the display device. The stepped portion such as an operation switch may be flat, convex or concave. Further, the stepped portion such as an operation switch may or may not be grained. The height difference of the step is not particularly limited as long as the step can be tactually perceived, and is, for example, 1 µm at smallest and 1 cm at largest.

When the surface film has such a step, a display section or an operation section can be tactually perceived even in circumstances where the display device does not emit light and the display section or the operation section is invisible. As will be described later, a thermoplastic elastomer composition that is used to form the surface film has properties suited for forming such a step.

The surface of the surface film of the present invention is smooth or has irregularities. When the surface of the surface film has irregularities, the surface may have a geometric shape or a leather-like shape. Among such shapes, a particularly preferred shape is one grained with irregularities including larger irregularities having a height difference of 20 µm to 500 µm and smaller irregularities having a height difference of 1 to 10 µm.

The surface of the surface film of the present invention preferably has a specular gloss at 60° of not more than 5%, and more preferably not more than 3% as measured in accordance with JIS 28741.

The surface film is formed of a thermoplastic elastomer composition.

The thermoplastic elastomer composition satisfies the following conditions (1) and (2).

(1) The melt flow rate (ASTM D1238, 230° C., 2.16 kg load; MFR) is not less than 30 g/10 min.

To attain good shaping properties, it is preferable that the MFR of the thermoplastic elastomer composition be high. In view of this, the MFR of the thermoplastic elastomer composition is not less than 30 g/10 min. If the MFR is too low, difficulties may be encountered in forming the surface film with a small thickness.

If, on the other hand, the MFR is too high, burrs occur easily during injection molding. (Burrs are unnecessary thin portions that protrude from the desired shape as a result of squeezing out from a gap in the mold during the molding process.) In view of this, the MFR of the thermoplastic elastomer composition is preferably not less than 30 g/10 min and not more than 500 g/10 min.

(2) The type A hardness (momentary value) measured by a method in accordance with JIS K6253 is 60 to 90.

If the type A hardness (momentary value) exceeds 90, the thermoplastic elastomer composition of the present invention comes to have a hard touch. If the type A hardness is below 60, the thermoplastic elastomer composition contains much rubber components and exhibits low fluidity.

In the thermoplastic elastomer composition of the present invention, the type A hardness (momentary value) is preferably 60 to 80.

The thermoplastic elastomer composition is preferably a composition including the following components (A) to (C):

(A) an ethylene/α-olefin copolymer comprising ethylene units and C3-C20 α-olefin units;

(B) a hydrogenated product of a block copolymer comprising at least one block principally comprising conjugated diene monomer units and at least one block principally comprising vinyl aromatic monomer units; and (C) an olefin resin.

The thermoplastic elastomer composition of the present invention may further include additional components such as a softener (D) and a polyorganosiloxane (E).

Components (A)

The component (A) is an ethylene/α-olefin copolymer comprising ethylene units and C3-C20 α-olefin units. The component (A) may be obtained by copolymerizing at least ethylene and a C3-C20 α-olefin. Examples of the C3-C20 α-olefins include propylene, 1-butene, 1-pentene, 1-hexene, 4-methyl-1-pentene, 1-heptene, 1-octene, 1-nonene, 1-decene, 1-undecene and 1-dodecene. Among these, C3-C12 α-olefins are preferable from the point of view of imparting flexibility, and propylene, 1-butene and 1-octene are more preferable.

Where necessary, a monomer having an unsaturated bond may be used as a comonomer for the component (A). Some preferred monomers having an unsaturated bond are, for example, conjugated diolefins such as butadiene and isoprene; non-conjugated diolefins such as 1,4-hexadiene; cyclic diene compounds such as dicyclopentadiene and norbornene derivatives; and acetylenes. Among these, ethylidene norbornene (ENB) and dicyclopentadiene (DCP) are more preferable from the point of view of flexibility.

The Mooney viscosity (ML) of the component (A) measured at 100° C. is not particularly limited, but is preferably 20 to 150 ML, and more preferably 50 to 120 ML from the points of view of crosslinking reactivity and the flexibility of the composition.

A metallocene catalyst is preferably used in the production of the component (A). A metallocene catalyst is generally composed of a cyclopentadienyl derivative of a Group IV metal such as titanium or zirconium, and a cocatalyst. Known metallocene catalysts may be used without limitation. A metallocene catalyst not only has high activity as a polymerization catalyst, but also gives a copolymer having a narrow molecular weight distribution as compared with a Ziegler catalyst and allows the C3-C20 α-olefin comonomer to be uniformly dispersed in the copolymer.

The copolymerization ratio of the α-olefin in the component (A) is not particularly limited, but is preferably 1 to 60 mass %, more preferably 10 to 50 mass %, and still more preferably 20 to 45 mass %. This range of the copolymerization ratio of the α-olefin ensures that the thermoplastic elastomer composition will attain further enhancements in mechanical strength (such as tensile strength) and flexibility.

The density of the component (A) is not particularly limited, but is preferably in the range of 0.8 to 0.9 g/cm³. When the component (A) has a density in this range, the thermoplastic elastomer composition that is obtained attains further enhanced flexibility.

The structure of the component (A) is not particularly limited, but preferably has long-chain branches. Here, the term long-chain branch means a branch having 3 or more carbon atoms. By virtue of the copolymer having long-chain branches, the density can be further reduced in relation to the copolymerization ratio (mass %) of the copolymerized α-olefin without causing a decrease in mechanical strength. Thus, the thermoplastic elastomer composition that is obtained attains lower density and higher strength. The olefin elastomer having long-chain branches is not particularly limited and may be, for example, an olefin elastomer described in literature such as U.S. Pat. No. 5,278,272.

The component (A) preferably shows a DSC (differential scanning calorimetry) melting point peak in a range of temperatures of room temperature and above. When the component (A) has a melting point peak in a range of temperatures of room temperature and above, the thermoplastic elastomer exhibits excellent morphological stability in a range of temperatures below the melting point, and also shows good handleability and less stickiness.

The melt flow rate of the component (A) is preferably in the range of 0.01 to 100 g/10 min (190° C., 2.16 kg load (0.212 Pa), in accordance with ASTM D1238), and more preferably in the range of 0.2 to 10 g/10 min. This range of melt flow rate ensures that the thermoplastic elastomer will attain an enhanced balance between fluidity and mechanical strength.

Components (B)

The component (B) is a hydrogenated product of a block copolymer comprising at least one block principally comprising conjugated diene monomer units and at least one block principally comprising vinyl aromatic monomer units. Here, the "vinyl aromatic monomer units" means constituent units forming a polymer after the polymerization of a vinyl aromatic compound as a monomer, and the molecular structure thereof is such that each unit is bonded through the two carbon atoms in the substituted ethylene group derived from the substituted vinyl group. Further, the "conjugated diene monomer units" means constituent units forming a polymer after the polymerization of a conjugated diene as a monomer, and the molecular structure thereof is such that each unit is bonded through two carbon atoms in an olefin derived from the conjugated diene monomer. In the block copolymer, the term "principally" means that the copolymer block comprises monomer units derived from a conjugated diene monomer (or a vinyl aromatic monomer) in an amount of not less than 50 mass %, preferably not less than 60 mass %, and more preferably not less than 80 mass % of the copolymer block. For example, the phrase that a block principally comprises conjugated diene monomer units means that the block comprises monomer units derived from a conjugated diene monomer in an amount of not less than 50 mass %, preferably not less than 60 mass %, and more preferably not less than 80 mass % of the block.

In the present embodiment, the vinyl aromatic monomer is not particularly limited. Examples thereof include vinyl aromatic compounds such as styrene, α-methylstyrene, p-methylstyrene, divinylbenzene, 1,1-diphenylethylene, N,N-dimethyl-p-aminoethylstyrene and N,N-diethyl-p-aminoethylstyrene. These may be used singly, or two or more may be used in combination. Among these, styrene is preferable from the point of view of economic efficiency.

In the present embodiment, the conjugated diene monomer is a diolefin having a pair of conjugated double bonds. Examples thereof include 1,3-butadiene (butadiene), 2-methyl-1,3-butadiene (isoprene), 2,3-dimethyl-1,3-butadiene, 1,3-pentadiene, 2-methyl-1,3-pentadiene and 1,3-hexadiene. Among these, butadiene and isoprene are preferable from the point of view of economic efficiency. These may be used singly, or two or more may be used in combination.

In the hydrogenated product of the block copolymer in the present embodiment, the arrangement of the blocks is not particularly limited and may be appropriately selected. For example, the hydrogenated product of the block copolymer may be represented as follows in which S denotes a polymer block composed of aromatic vinyl monomer units, and B denotes a polymer block composed of conjugated diene monomer units and/or partially hydrogenated units thereof: linear block copolymers such as those represented by SB, $S(BS)n1$ (where n1 represents an integer of 1 to 3) and $S(BSB)n2$ (where n2 represents an integer of 1 or 2), and copolymers represented by $(SB)n3X$ (where n3 represents an integer of 3 to 6, and X denotes a residue of a coupling agent such as silicon tetrachloride, tin tetrachloride or a polyepoxy compound). Among these, linear block copolymers such as two-block (diblock) SB, three-block (triblock) SBS and four-block (tetrablock) SBSB are preferable.

The content of the vinyl aromatic monomer units in the component (B) is 30 to 80 mass %. From the points of view of heat resistance and dispersibility, the content is preferably 40 to 80 mass %, and more preferably 50 to 70 mass %. By controlling the content of the vinyl aromatic monomer units to 30 mass % or more, mechanical properties are further enhanced. Further improved low-temperature characteristics may be obtained by limiting the content to 80 mass % or less. The content of the vinyl aromatic monomer units in the component (B) may be measured by nuclear magnetic resonance spectroscopy (NMR).

From the point of view of mechanical strength, the content of the vinyl aromatic monomer unit block in the component (B) is preferably not less than 10 mass %, and more preferably 10 to 40 mass %. Here, the content of the vinyl aromatic compound polymer block in the component (B) is defined by the following equation using the mass of a vinyl aromatic compound polymer block (here, the mass excludes vinyl aromatic compound polymers having an average degree of polymerization of about 30 or less) obtained by oxidatively decomposing the copolymer before hydrogenation with tert-butyl hydroperoxide using osmium tetroxide as a catalyst (this method is described in I. M. Kolthoff, et al., J. Polym. Sci. 1,429 (1946), hereinafter also referred to as the "osmium tetroxide decomposition method").

Content (mass %) of vinyl aromatic compound polymer block=(mass of vinyl aromatic compound polymer block in copolymer before hydrogenation/mass of copolymer before hydrogenation)×100

When a plurality of polymer blocks present in the component (B), structures such as molecular weight and composition in each block may be the same as or different from one another. For example, the component (B) may comprise a hydrogenated copolymer block comprising conjugated diene monomer units and vinyl aromatic monomer units, and a hydrogenated copolymer block principally comprising conjugated diene monomer units. The blocks do not necessarily have clearly distinguishable boundaries or ends. In each polymer block, the vinyl aromatic monomer units may be distributed in any manner without limitation, that is, the distribution may be uniform, tapered, stepwise, convex or concave. Further, the polymer blocks may have a crystal portion.

In each polymer block, the vinyl units in the conjugated diene monomer units may be distributed in any manner without limitation. For example, the distribution may be uneven. For example, the distribution of the vinyl units may be controlled by adding a vinylating agent during polymerization, or by changing the polymerization temperature. Further, the conjugated diene monomer units may have an uneven distribution of hydrogenation ratio. The distribution of hydrogenation ratio may be controlled by, for example, changing the manner in which the vinyl units are distributed, or by hydrogenating a copolymer of isoprene and butadiene using a hydrogenation catalyst described later to make use of the difference in hydrogenation rate between the isoprene units and the butadiene units.

From the points of view of heat resistance, aging resistance and weather resistance, the component (B) is preferably such that hydrogen has been added to not less than 75 mol %, more preferably not less than 85 mol, and still more preferably not less than 97 mol % of the unsaturated bonds contained in the conjugated diene monomer units before hydrogenation.

The hydrogenation catalyst used for hydrogenation is not particularly limited and may be one that is conventionally known. Use may be made of supported heterogenous hydrogenation catalysts (1) in which a metal such as Ni, Pt, Pd or Ru is supported on a carrier such as carbon, silica, alumina or diatomaceous earth; so-called Ziegler hydrogenation catalysts (2) that include a salt, for example, an organic acid salt or an acetylacetone salt of a transition metal such as Ni, Co, Fe or Cr, and a reducing agent such as an organoaluminum; and homogeneous hydrogenation catalysts (3) such as so-called organometallic complexes, for example, organometallic compounds such as those of Ti, Ru, Rh and Zr. Specific examples of the hydrogenation catalysts include those hydrogenation catalysts described in literature such as JP-B-S42-008704, JP-B-S43-006636, JP-B-S63-004841, JP-B-H01-037970, JP-B-H01-053851 and JP-B-H02-009041. Among these, preferred hydrogenation catalysts are reducing organometallic compounds such as titanocene compounds.

For example, the titanocene compound may be a compound described in JP-A-H08-109219. Specific examples include those compounds that have at least one ligand having a (substituted) cyclopentadienyl skeleton, indenyl skeleton or fluorenyl skeleton, such as biscyclopentadienyl titanium dichloride and monopentamethylcyclopentadienyl titanium trichloride.

Examples of the reducing organometallic compounds include organoalkali metal compounds such as organolithiums, organomagnesium compounds, organoaluminum compounds, organoboron compounds and organozinc compounds.

In the present embodiment, the component (B) before hydrogenation may be produced by any known polymerization method without limitation. Examples of the methods include those described in JP-B-S36-019286, JP-B-S43-017979, JP-B-S46-032415, JP-B-S49-036957, JP-B-S48-002423, JP-B-S48-004106, JP-B-S56-028925, JP-A-S59-166518 and JP-A-S60-186577.

Where necessary, the component (B) may have a polar group. Examples of the polar groups include hydroxyl groups, carboxyl groups, carbonyl groups, thiocarbonyl groups, acid halide groups, acid anhydride groups, thiocarboxylic acid groups, aldehyde groups, thioaldehyde groups, carboxylic acid ester groups, amide groups, sulfonic acid groups, sulfonic acid ester groups, phosphoric acid groups, phosphoric acid ester groups, amino groups, imino groups, nitrile groups, pyridyl groups, quinoline groups, epoxy groups, thioepoxy groups, sulfide groups, isocyanate groups, isothiocyanate groups, silicon halide groups, alkoxysilicon groups, tin halide groups, boronic acid groups, boron-containing groups, boronic acid salt groups, alkoxytin groups and phenyltin groups.

The vinyl bond content in the conjugated diene monomer units in the copolymer before hydrogenation into the component (B) is preferably not less than 5 mol % from the points of view of flexibility and scratch resistance, and is preferably not more than 70 mol % from the points of view of productivity, break elongation and scratch resistance. The vinyl bond content in the conjugated diene monomer units is more preferably 10 to 50 mol %, still more preferably 10 to 30 mol %, and further preferably 10 to 25 mol %.

Here, the vinyl bond content is the proportion of conjugated diene units that are 1,2-bonded and 3,4-bonded relative to the total of conjugated diene units that are 1,2-bonded, 3,4-bonded and 1,4-bonded in the copolymer before hydrogenation. The vinyl bond content may be measured by NMR.

The weight average molecular weight of the component (B) before crosslinking is not particularly limited, but is preferably not less than 50,000 from the point of view of scratch resistance and is preferably not more than 400,000 from the point of view of shaping fluidity. The weight average molecular weight is more preferably 50,000 to 300,000. The molecular weight distribution (Mw/Mn; weight average molecular weight/number average molecular weight) is not particularly limited, but is preferably a value close to 1 from the point of view of scratch resistance. The weight average molecular weight and the number average molecular weight may be determined by gel permeation chromatography (GPC; device name: "LC-10" manufactured by Shimadzu Corporation) at an oven temperature of 40° C. using TSKgel GMHXL (4.6 mm ID×30 cm, 2 columns) in tetrahydrofuran (1.0 mL/min) as a solvent. The weight average molecular weight (Mw), the number average molecular weight (Mn) and the molecular weight distribution (Mw/Mn) are calculated as polystyrene-equivalent molecular weights.

From the point of view of abrasion resistance, the block in the component (B) principally comprising conjugated diene monomer units is preferably a copolymer block that principally comprises conjugated diene monomer units and also comprises vinyl aromatic monomer units.

The copolymer block principally comprising conjugated diene monomer units and also comprising vinyl aromatic monomer units is not particularly limited, and the conjugated diene monomers and the vinyl aromatic monomers described hereinabove may be used. Among combinations of such monomers, for example, a block comprising butadiene units and styrene units, and a block comprising isoprene units and styrene units are preferable from the point of view of the balance between mechanical strength and impact resistance.

In the copolymer block principally comprising conjugated diene monomer units and also comprising vinyl aromatic monomer units, the contents of the respective monomers are not particularly limited at least as long as the conjugated diene monomer units represent the major proportion. In particular, from the point of view of the balance between mechanical strength and impact resistance, the content of the vinyl aromatic monomer units in the copolymer block is preferably not less than 10 mass % and less than 50 mass %, and more preferably not less than 20 mass % and less than 50 mass %.

The component (B) is preferably a combination of at least two or more kinds of hydrogenated products of block copolymers comprising (B-1) a hydrogenated product of a block copolymer having a content of a vinyl aromatic monomer unit block of not less than 20 mass % and less than 50 mass %, and (B-2) a hydrogenated product of a block copolymer having a content of a vinyl aromatic monomer unit block of not less than 50 mass % and not more than 80 mass %. The component (B-1) having a lower content of vinyl aromatic monomer units contributes to low-temperature characteristics of the thermoplastic elastomer composition, and the component (B-2) having a higher content of vinyl aromatic monomer units contributes to the morphology stabilization of the matrix and domains in the thermoplastic elastomer composition. The mass ratio (component (B-1)/component (B-2)) of the component (B-1) to the component (B-2) is preferably 90/10 to 60/40 from the points of view of low-temperature characteristics and mechanical properties.

From the points of view of fluidity and hardness, the mass ratio (component (A)/component (B)) of the component (A) to the component (B) is preferably 20/80 to 75/25, and more preferably 25/75 to 60/40.

Components (C)

The component (C) is an olefin resin other than the components (A). Among the olefin resins, propylene resins are preferable from the point of view of mechanical strength. Some preferred propylene resins are, for example, isotactic polypropylene that is a homopolymer; and isotactic copolymers (including block copolymers and random copolymers) of propylene and other α-olefins such as ethylene, 1-butene, 1-pentene and 1-hexene. The melt flow rate of the olefin resin is preferably in the range of 0.1 to 100 g/10 min (230° C., 2.16 kg load (0.212 MPa)). By limiting the melt flow rate to not more than 100 g/10 min, the heat resistance and the mechanical strength of the thermoplastic elastomer composition may be further enhanced. By controlling the melt flow rate to not less than 0.1 g/10 min, fluidity and shaping processability may be further enhanced.

The content of the component (C) is 20 to 150 parts by mass with respect to the total of the component (A) and the component (B) taken as 100 parts by mass, and is preferably 40 to 100 parts by mass from the points of view of low-temperature characteristics and flexibility. If the content is less than 20 parts by mass, the thermoplastic elastomer composition may exhibit low shaping fluidity. If the content is more than 150 parts by mass, the thermoplastic elastomer composition may have insufficient flexibility.

The thermoplastic elastomer composition in the present embodiment is preferably crosslinked. Crosslinking advantageously offers enhanced heat resistance and reduces the gloss of films. The composition may be crosslinked by any method without limitation, and is preferably crosslinked with a crosslinking agent. More specifically, the crosslinking agent preferably includes a crosslinking initiator and optionally further includes a polyfunctional monomer and a monofunctional monomer as crosslinking aids. The content of the crosslinking initiator is not particularly limited, but is preferably less than 10 parts by mass, and more preferably less than 5 parts by mass with respect to 100 parts by mass of the component (C).

The crosslinking initiators are not particularly limited and may be, for example, radical initiators such as organic peroxides and organic azo compounds. Specific examples thereof include peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy)valerate; dialkyl peroxides such as di-t-butyl peroxide, dicumyl peroxide, t-butyl cumyl peroxide, α,α'-bis(t-butylperoxy-m-isopropyl)benzene, α,α'-bis(t-butylperoxy)diisopropylbenzene, 2,5-dimethyl-2,5-bis(t-butylperoxy)hexane and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-butyl peroxyacetate, t-butyl peroxyisobutyrate, t-butyl peroxy-2-ethylhexanoate, t-butyl peroxylaurylate, t-butyl peroxybenzoate, di-t-butyl peroxyisophthalate, 2,5-dimethyl-2,5-di(benzoylperoxy)hexane, t-butyl peroxymaleate, t-butyl peroxyisopropyl carbonate and cumyl peroxyoctoate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl peroxide.

Among these compounds, 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3 are preferable.

The polyfunctional monomer as a crosslinking aid preferably has a radically polymerizable functional group as a functional group, and more preferably has a vinyl group. The number of functional groups is at least two. Particularly high effects are obtained when the number of functional groups is three or more including the functional group in the monofunctional monomer.

Preferred specific examples of the polyfunctional monomers include divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinonedioxime, p,p'-dibenzoylquinonedioxime, phenylmaleimide, allyl methacrylate, N,N'-m-phenylenebismaleimide, diallyl phthalate, tetraallyloxyethane and 1,2-polybutadiene. Among these, divinylbenzene and triallyl isocyanurate are more preferable. The polyfunctional monomers may be used singly, or two or more may be used in combination.

The monofunctional monomer as a crosslinking aid is preferably a radically polymerizable vinyl monomer. By using such a monomer, the crosslinking reaction rate may be controlled. Examples of the vinyl monomers include aromatic vinyl monomers, unsaturated nitrile monomers such as acrylonitrile and methacrylonitrile, acrylic acid ester monomers, methacrylic acid ester monomers, acrylic acid monomers, methacrylic acid monomers, maleic anhydride monomers and N-substituted maleimide monomers.

Components (D)

The thermoplastic elastomer composition preferably further includes a softener (D). The softeners are not particularly limited but are preferably hydrocarbon process oils such as paraffinic, naphthenic or aromatic. Among such process oils, paraffinic hydrocarbon-based process oils are preferable, and naphthenic hydrocarbon-based process oils are preferable from the point of view of compatibility with rubbers. From the points of view of thermal stability and light stability, the content of an aromatic hydrocarbon in the process oil is preferably not more than 10%, more preferably not more than 5%, and still more preferably not more than 1% in terms of the percentage of carbons measured in accordance with ASTM D2140-97.

To control the hardness and the flexibility of the composition, the content of the component (D) is preferably 5 to 500 parts by mass, and more preferably 10 to 150 parts by mass with respect to the total of the components (A), (B) and (C) taken as 100 parts by mass. By controlling the content to not less than 5 parts by mass, flexibility and processability may be further enhanced. By limiting the content to not more than 500 parts by mass, the occurrence of oil bleeding may be further reduced.

Components (E)

The thermoplastic elastomer composition preferably further includes a polyorganosiloxane (E). The structure of the polyorganosiloxane is not particularly limited. From the points of view of abrasion resistance and texture, it is preferable that the polymer structure be a crosslinked network of linear structures, branched structures or the like, and the kinematic viscosity (25° C.) in accordance with JIS-K2410 be not less than 5000 centistokes (cSt). Useful polyorganosiloxanes are generally polymers that comprise siloxane units substituted with an alkyl group, a vinyl group and/or an aryl group, with polydimethylsiloxanes substituted with methyl groups being more preferable.

The content of the component (E) is preferably 0.1 to 20 parts by mass, and more preferably 1.0 to 10 parts by mass with respect to the total of the components (A), (B) and (C) taken as 100 parts by mass. By controlling the content to not less than 0.1 part by mass, abrasion resistance may be enhanced. By limiting the content to not more than 20 parts by mass, the occurrence of the bleeding of the polydimethylsiloxane may be further reduced.

Further, the thermoplastic elastomer composition may contain an inorganic filler and a plasticizer as long as the effects of the composition are not impaired. Examples of the inorganic fillers which may be used here include calcium carbonate, magnesium carbonate, silica, carbon black, glass fibers, titanium oxide, clay, mica, talc, magnesium hydroxide and aluminum hydroxide. Examples of the plasticizers include polyethylene glycol and phthalic acid esters such as dioctyl phthalate (DOP). The thermoplastic elastomer composition may further contain other additives such as organic or inorganic pigments, heat stabilizers, oxidation inhibitors, UV absorbers, light stabilizers, flame retardants, silicone oils, antiblocking agents, foaming agents, antistatic agents and antibacterial agents.

The thermoplastic elastomer composition may be produced using a general device usually used in the production of a resin composition or an elastomer composition, for example, a Banbury mixer, a kneader, a single-screw extruder or a twin-screw extruder. Among these devices, a twin-screw extruder is preferable because dynamic crosslinking is achieved particularly efficiently. With use of a twin-screw extruder, the components (A), (B) and (C) may be dispersed uniformly and finely and also the crosslinking reaction may occur in an accelerated manner in the presence of other components that are added. As a result, advantageously, the thermoplastic elastomer composition may be produced continuously.

The thermoplastic elastomer composition in the present embodiment is preferably produced through the following processing steps.

The components (A), (B) and (C) are mixed well and added into a hopper of an extruder. The crosslinking agent may be added at any timing without limitation. For example, the crosslinking agent may be added at the start together with the components (A), (B) and (C), or part of the crosslinking agent may be added at some midpoint in the extruder. Further, part of the components (A), (B) and (C) may be added at some midpoint in the extruder.

The softener (D) may be added at any timing without limitation, for example, may be added at some midpoint in the extruder or may be added in portions at the start and at some midpoint. In this case too, if necessary, part of the crosslinking agent may be added at some midpoint in the extruder. Further, the softener may be added as a mixture with other additives.

The polyorganosiloxane (E) may be added at any timing without limitation, and may be added at the start, may be added in portions at the start and at some midpoint, or may be added at some midpoint. The component (E) may be added in any manner without limitation, and may be mixed together with an appropriate thermoplastic resin or elastomer beforehand to form a masterbatch containing a high concentration of the organosiloxane.

When the components are thermally melted and kneaded in the extruder, the component (A) and the crosslinking agent may undergo a crosslinking reaction while, at the same time, the olefin resin as the component (C) may undergo a decomposition reaction with the crosslinking agent to offer enhanced shaping fluidity. From this point of view, it is preferable that a radically decomposable olefin resin be used as the component (C). Further, a component such as the softener (D) may be added and may be kneaded and dispersed sufficiently by melt-kneading while performing the crosslinking reaction, and the mixture may be then taken out from the extruder in the form of pellets of the thermoplastic elastomer composition of the present embodiment.

In a particularly preferred melt extrusion method, a twin-screw extruder may be used which has a length L extending from an ingredient feed section toward a die and has L/D in the range of 5 to 100 (wherein D represents the barrel diameter). The twin-screw extruder preferably has a plurality of feed sections including a main feed section and a side feed section different from one another in distance from the tip portion of the extruder. Such a twin-screw extruder preferably has kneading sections between the feed sections and between the tip portion and the feed section close to the tip portion, and the lengths of the kneading sections are preferably each 3D to 10D.

A twin-screw extruder, which is one of the manufacturing devices that may be used in the present embodiment, may be a twin-screw co-rotating extruder or a twin-screw counter-rotating extruder. The type of screw meshing is not limited and may be non-meshing type, partial meshing type or complete meshing type. When a uniform resin is to be obtained by applying a low shear force at a low temperature, counter-rotating partially meshing screws are preferable. When the kneading scale is relatively large, co-rotating completely meshing screws are preferable. Co-rotating completely meshing screws are preferable for a larger scale of kneading.

To impart excellent mechanical strength to the thermoplastic elastomer composition that is obtained, it is more preferable that the degree M of kneading with a twin-screw extruder satisfy the relationship of the following formula (i).

$$10 \times 10^6 \leq M \leq 1000 \times 10^6 \qquad (i)$$

Here, kneading degree M: $(\pi^2/2)(L/D)D^3(N/Q)$,

L: extruder length (mm) extending from an ingredient feed section toward a die,

D: extruder barrel inner diameter (mm),
Q: output (kg/h),
N: screw rotational speed (rpm).

By controlling the kneading degree M in the formula (i) to not less than $10 \times 10^6$, the enlargement and aggregation of rubber particles may be prevented and a good appearance may be obtained. By limiting M to not more than $1000 \times 10^6$, it is possible to prevent a decrease in mechanical strength due to an excessively high shear force.

The elastomer composition thus obtained may be formed into a surface film described hereinabove by any shaping method. Examples of the shaping methods include, but are not particularly limited to, injection molding, extrusion, compression molding, blow molding, calendering and expansion molding. Further, the surface film may also be produced by subjecting a sheet of the composition into vacuum forming so as to impart a shape or transfer irregularities to the surface. Alternatively, the surface film may also be produced by processing the elastomer composition obtained into a powder by freeze pulverization or the like, and slush molding the powder. Among these methods, injection molding is particularly preferable. By injection molding, a step described hereinabove may be easily formed on the surface film.

By providing a step on the surface film as described above, the display device of the present invention allows a user to tactually perceive a display section or an operation section even in a circumstance where the display device does not emit light and the display section or the operation section is invisible. Such steps may be easily formed by, in particular, injection molding of the thermoplastic elastomer composition that is used for the formation of the surface film.

The surface film of the present invention has a good touch. In order to obtain a good touch, for example, the surface film preferably has a hardness described in [1] of the present invention.

Further, the surface film of the present invention attains excellent durability. That is, the surface film of the present invention is excellent in heat resistance, aging resistance, weather resistance, abrasion resistance and scratch resistance, and is also resistant to permanent set in fatigue and to bleeding out. Specifically, the change in surface condition is negligible and the grains are maintained even after long-term use. To ensure that the surface film will have a minor change in surface condition and will be resistant to permanent set in fatigue, for example, it is preferable that the thermoplastic elastomer composition contain the components described in [2] in the present invention, and it is also preferable that the thermoplastic elastomer be crosslinked as described in [4] in the present invention. When the surface film of the present invention does not contain a large amount of a low-molecular weight (or volatile) plasticizer such as vinyl chloride, the surface film will not have a sticky touch stemming from the bleeding out of the plasticizer and will not be yellowed unlike general urethanes.

As described hereinabove, the display device of the present invention attains an upscale appearance and a good touch offered by the surface film, and can display clearly visible images during illumination periods. During non-illumination times, the display element is not conspicuous and the surface film can fully exhibit its good appearance (decorative effects). When a step such as, for example, one described in [8] in the present invention is provided on a display section or an operation section, the display section or the operation section may be tactually perceived even during non-illumination times. Further, the display device attains superior durability, specifically, is resistant to heat, deterioration with time, deterioration caused by the natural environment, abrasion and scratches and is also resistant to permanent set in fatigue, bleeding out and yellowing. When, in particular, the composition contains the components described in, for example, [2] in the present invention, the display device is particularly excellent in the above durability characteristics. These excellent features are not realized by the conventional display devices but became possible for the first time by specifying various characteristics in the present invention as described hereinabove.

As described hereinabove, the display devices of the present invention may be used by being incorporated into interior members for vehicles such as automobiles, and may also be used as part of the interiors in the inside of buildings (such as office buildings, hotels, stores and general houses). Further, the display devices of the present invention may be used in any kinds of applications including liquid crystal televisions, lighting switches, bathroom monitors, furniture, audio equipment, speakers and home appliances (such as rice cookers, microwave ovens, washing machines, air conditioner panels, telephones and remote controllers).

EXAMPLES

Hereinbelow, the present invention will be described in greater detail with reference to Examples and Comparative Examples. However, it should be construed that the scope of the present invention is not limited to such Examples. The numerical values in Examples are on mass basis unless otherwise specified.

Components in raw materials used in Examples and Comparative Examples were tested by the following methods.

(1) Hydrogenation Ratio (%)

The hydrogenation ratio was measured by nuclear magnetic resonance spectroscopy (NMR). A nuclear magnetic resonance measurement device (device name: "JNM-LA400" manufactured by JEOL Ltd.) was used as a measurement device. Deuterated chloroform was used as a solvent. Tetramethylsilane (TMS) was used as a chemical shift reference. The measurement was performed under conditions of a sample concentration of 50 mg/mL, an observation frequency of 400 MHz, a pulse delay of 2.904 seconds, a number of scans of 64, a pulse width of 45° and a measurement temperature of 26° C.

(2) Contents of monomer units and bond units The contents of vinyl aromatic monomer units, ethylene monomer units, butylene monomer units, 1,4-bonded butadiene units, 1,2-bonded butadiene units and 3,4-bonded butadiene units were measured by NMR. A nuclear magnetic resonance measurement device (device name: "JNM-LA400" manufactured by JEOL Ltd.) was used as a measurement device. Deuterated chloroform was used as a solvent. Tetramethylsilane (TMS) was used as a chemical shift reference. The measurement was performed under conditions of a sample concentration of 50 mg/mL, an observation frequency of 400 MHz, a pulse delay of 2.904 seconds, a number of scans of 64, a pulse width of 45° and a measurement temperature of 26° C.

(3) Styrene Polymer Block Content (Os Value)

The styrene polymer block content was measured by the method described in I. M. Kolthoff, et al., J. Polym. Sci. 1,429 (1946) (osmium tetroxide decomposition method) with respect to a copolymer before hydrogenation. A 0.1 g/125 mL tertiary butanol solution of osmium acid was used for the decomposition of the copolymer before hydrogenation. The styrene polymer block content was calculated using the following formula. The styrene polymer block content obtained here will be referred to as the "Os value".

Styrene polymer block content (Os value; mass %)=
[(mass of styrene polymer block in copolymer before hydrogenation)/(mass of copolymer before hydrogenation)]×100

(A) Ethylene/α-Olefin Copolymers
(1) Ethylene/α-Olefin Copolymer (A-1)
A copolymer of ethylene and 1-octene (produce name: "Engage 8842" manufactured by The Dow Chemical Company) was used. In this copolymer, the ethylene content was 55 mass % and the 1-octene content was 45 mass %. (Hereinafter, the copolymer will be written as "A-1").
(2) Ethylene/α-Olefin Copolymer (A-2)
A copolymer was produced by the metallocene method described in JP-A-H03-163088. The ethylene/1-octene compositional ratio in the copolymer obtained was 72/28 (by mass). (Hereinafter, the copolymer obtained will be written as "A-2".)
(B) Hydrogenated Products of Block Copolymers
(1) Preparation of Hydrogenation Catalyst
A hydrogenation catalyst used for the hydrogenation reaction of block copolymers (B) was prepared by the following method. A nitrogen-purged reaction vessel was charged with 1 L of dried and purified cyclohexane and then with 100 mmol of bis(cyclopentadienyl)titanium dichloride. Further, an n-hexane solution containing 200 mmol of trimethylaluminum was added while performing sufficient stirring. The mixture was reacted at room temperature for about 3 days.
(2) Production of Hydrogenated Product of Block Copolymer (B-1)
Batch polymerization was carried out using a 10 L internal volume tank reactor equipped with a stirrer and a jacket. First, 6.4 L of dried and purified cyclohexane was charged, and 175 g of styrene was added. Tetramethylethylenediamine (TMEDA) was added beforehand in a molar amount 0.30 times the number of moles of Li in n-butyllithium initiator, and thereafter n-butyllithium initiator was added so that the number of moles of Li would be 11 mmol. Polymerization was then performed at an initial temperature of 65° C. After the completion of the polymerization, a cyclohexane solution containing 650 g of butadiene (monomer concentration: 22 mass %) was continuously supplied to the reactor at a constant rate over a period of 60 minutes. Thereafter, a cyclohexane solution containing 175 g of styrene (monomer concentration: 22 mass %) was further added over a period of 10 minutes. A copolymer was thus obtained. The copolymer obtained had a styrene polymer block content of 35 mass % and a vinyl bond content of 36%.
The hydrogenation catalyst was added to the obtained copolymer in an amount of 100 ppm in terms of titanium per 100 parts by mass of the copolymer. Thereafter, a hydrogenation reaction was performed at a hydrogen pressure of 0.7 MPa and a temperature of 75° C. to give a reaction solution. To the reaction solution obtained, octadecyl-3-(3,5-di-t-butyl-4-hydroxyphenyl) propionate as a stabilizer was added in an amount of 0.3 parts by mass with respect to 100 parts by mass of the hydrogenated product of the block copolymer. The weight average molecular weight of the hydrogenated product of the block copolymer (B-1) thus obtained was 150,000. The hydrogenation ratio of the double bonds in butadiene contained in the hydrogenated product of the block copolymer (B-1) was 99%.

(3) Production of Hydrogenated Product of Block Copolymer (B-2)
Batch polymerization was carried out using a 10 L internal volume tank reactor equipped with a stirrer and a jacket. First, 6.4 L of cyclohexane and 325 g of styrene were added. TMEDA was added beforehand in a molar amount 0.40 times the number of moles of Li in n-butyllithium, and thereafter n-butyllithium initiator was added so that the number of moles of Li would be 20 mmol. Polymerization was then performed at an initial temperature of 65° C. After the completion of the polymerization, a cyclohexane solution containing 350 g of butadiene (monomer concentration: 22 mass %) was continuously supplied to the reactor at a constant rate over a period of 60 minutes. Thereafter, a cyclohexane solution containing 325 g of styrene (monomer concentration: 22 mass %) was added over a period of 10 minutes. A copolymer was thus obtained. The copolymer obtained had a styrene polymer block content of 65 mass % and a vinyl bond content of 40%.
The hydrogenation catalyst was added to the obtained copolymer in an amount of 100 ppm in terms of titanium per 100 parts by mass of the polymer. Thereafter, a hydrogenation reaction was performed at a hydrogen pressure of 0.7 MPa and a temperature of 75° C. To the resultant polymer solution, octadecyl-3-(3,5-di-t-butyl-4-hydroxyphenyl) propionate as a stabilizer was added in an amount of 0.3 parts by mass with respect to 100 parts by mass of the hydrogenated product of the block copolymer. The weight average molecular weight of the hydrogenated product of the block copolymer (B-2) thus obtained was 50,000. The hydrogenation ratio of the double bonds in butadiene contained in the hydrogenated product of the block copolymer (B-2) was 99%.
(4) Production of Hydrogenated Product of Block Copolymer (B-3)
Batch polymerization was carried out using a 10 L internal volume tank reactor equipped with a stirrer and a jacket. First, 6.4 L of cyclohexane and 75 g of styrene were added. TMEDA was added beforehand in a molar amount 0.25 times the number of moles of Li in n-butyllithium, and thereafter n-butyllithium initiator was added so that the number of moles of Li would be 10 mmol. Polymerization was then performed at an initial temperature of 65° C. After the completion of the polymerization, a cyclohexane solution containing 470 g of butadiene and 380 g of styrene (monomer concentration: 22 mass %) was continuously supplied to the reactor at a constant rate over a period of 60 minutes. Thereafter, a cyclohexane solution containing 75 g of styrene (monomer concentration: 22 mass %) was added over a period of 10 minutes. A copolymer was thus obtained. The copolymer obtained had a styrene content of 53 mass %. The styrene polymer block content in the copolymer was 15 mass %. In the copolymer block (namely, the copolymer block comprising conjugated diene monomer units and vinyl aromatic monomer units), the styrene content was 45 mass % and the vinyl bond content was 23%.
The hydrogenation catalyst was added to the obtained copolymer in an amount of 100 ppm in terms of titanium per 100 parts by mass of the polymer. Thereafter, a hydrogenation reaction was performed at a hydrogen pressure of 0.7 MPa and a temperature of 75° C. To the resultant polymer solution, octadecyl-3-(3,5-di-t-butyl-4-hydroxyphenyl) propionate as a stabilizer was added in an amount of 0.3 parts by mass with respect to 100 parts by mass of the hydrogenated product of the block copolymer. The weight average molecular weight of the hydrogenated product of the block copolymer (B-3) thus obtained was 160,000. The hydrogenation ratio of the double bonds in butadiene contained in the hydrogenated product of the block copolymer (B-3) was 99%.

(5) Production of Hydrogenated Product of Block Copolymer (B-4)

Batch polymerization was carried out using a 10 L internal volume tank reactor equipped with a stirrer and a jacket. n-Butyllithium initiator was prepared beforehand while adding tetramethylethylenediamine in a molar amount 0.35 times the number of moles of Li in n-butyllithium. 6.4 L of cyclohexane and 100 g of styrene were then added to the reactor. Thereafter, the n-butyllithium initiator was added so that the number of moles of Li in the n-butyllithium initiator would be 0.009 mol. Polymerization was then performed at an initial temperature of 65° C. After the completion of the polymerization, a cyclohexane solution containing 300 g of butadiene and 500 g of styrene (monomer concentration: 22 mass %) was continuously supplied to the reactor at a constant rate over a period of 60 minutes. Thereafter, a cyclohexane solution containing 100 g of styrene (monomer concentration: 22 mass %) was added over a period of 10 minutes. A copolymer was thus obtained. The copolymer obtained had a styrene content of 70 mass %. The styrene polymer block content in the copolymer was 16 mass %. In the copolymer block (namely, the copolymer block comprising conjugated diene monomer units and vinyl aromatic monomer units), the styrene content was 62.5 mass % and the vinyl bond content was 16%.

The hydrogenation catalyst was added to the obtained copolymer in an amount of 100 ppm in terms of titanium per 100 parts by mass of the copolymer. Thereafter, a hydrogenation reaction was performed at a hydrogen pressure of 0.7 MPa and a temperature of 75° C. to give a reaction solution. To the reaction solution obtained, octadecyl-3-(3,5-di-t-butyl-4-hydroxyphenyl) propionate as a stabilizer was added in an amount of 0.3 parts by mass with respect to 100 parts by mass of the hydrogenated product of the block copolymer. The weight average molecular weight of the hydrogenated product of the block copolymer (B-4) thus obtained was 170,000. The hydrogenation ratio of the double bonds in butadiene contained in the hydrogenated product of the block copolymer (B-4) was 99%.

(C) Olefin Resin

Homopolypropylene (produce name: Prime Polypro (registered trademark) E111G (manufactured by Prime Polymer Co., Ltd., melt flow rate (MFR) at 230° C. under 2.16 kg load: 0.5 g/10 min)

(D) Softener

Paraffinic oil (produce name: "Diana Process Oil PW-90" manufactured by Idemitsu Kosan Co., Ltd.)

(E) Polyorganosiloxane

Dimethylsiloxane (produce name: "SH200" manufactured by Toray Dow Corning; kinematic viscosity: 60,000 centistokes (cSt)) Crosslinking agent A crosslinking agent including a crosslinking initiator and crosslinking aids (polyfunctional monomers) was used.

The crosslinking initiator that was used was 2,5-dimethyl-2,5-bis(t-butylperoxy)hexane (produce name: "PERHEXA 25B" manufactured by NOF CORPORATION).

The crosslinking aids that were used, and the amounts thereof with respect to 100 parts by mass of the olefin resin (C) are described below.

Triallyl isocyanurate (manufactured by Nihon Kasei CO., LTD.; hereinafter written as "TRIC"): 1.4 parts by mass
Divinylbenzene (manufactured by Wako Pure Chemical Industries, Ltd.; hereinafter written as "DVB"): 0.4 parts by mass Examples and Comparative Examples As an extruder, a twin-screw extruder ("KTX-30" manufactured by Kobe Steel, Ltd., 30 mm (I), L/D=74) was used which had an oil inlet at the center of the barrel. The screws that were used were dual-threaded screws having kneading sections at the upstream and downstream of the inlet. The ingredients described in Table 1 other than the softener were mixed together at one time in a compositional ratio (a ratio in parts by mass) shown in Table 1. The ingredients were then introduced into the twin-screw extruder (cylinder temperature: 200° C.) through a metering feeder. Subsequently, the softener in an amount described in Table 1 was injected with a pump through the inlet at the center of the extruder. The mixture was melt-extruded into a thermoplastic elastomer composition.

Properties of the thermoplastic elastomer compositions obtained and of samples were evaluated by the following methods. The results are described in Table 1. (1) MFR (g/10 min)

The melt flow rate was measured at 230° C. under a load of 2.16 kgf in accordance with JIS K7120.

(2) Shore Hardness Measurement

In accordance with JIS K6253, 2 mm thick pressed sheets were prepared from the thermoplastic elastomer composition. Three such pressed sheets were stacked on top of one another to form a 6 mm thick laminate sheet, which was then tested with a Shore A hardness meter. The value (momentary value) immediately after the measurement was determined as the Shore hardness.

Injection Molding

Injection molding machine "M150CL-DM" manufactured by Meiki Co., Ltd. was used. The mold that was used was a flat plate mold that had a size 15 cm in length and 9 cm in width and was leather grained with a grain depth of 35 μm on half of the cavity surface and with a grain depth of 45 μm on the other half of the surface.

The thermoplastic elastomer compositions were injection molded under conditions of a resin temperature of 220° C. and a mold temperature of 40° C. The molded articles were obtained with thicknesses described in Table 1 while changing the spacing between the mold plates.

The injection molded evaluation samples obtained by the above injection molding process were tested and evaluated by the following methods. The results are described in Table 1. Incidentally, "Fail" means that injection molding failed.

(3) Total Light Transmittance (%)

The total light transmittance was measured with respect to the injection molded evaluation samples by a method in accordance with JIS K7361.

(4) Specular Gloss (%) at 60°

The specular gloss at 60° was measured with respect to the injection molded evaluation samples by a method in accordance with JIS Z.

(5) Soft/Hard Tactile Sensation

The soft/hard tactile sensation was evaluated according to the following criteria by pushing the surface of the injection molded evaluation sample with a finger. The soft/hard tactile sensation was evaluated by three people. All the evaluators were unanimous about the results.

○: Good (The touch was soft, and the finger felt a deformation when pushing the surface.)

Δ: Not good (The touch was slightly hard, and the finger felt only a small deformation when pushing the surface.)

x: Poor (The touch was hard, and the finger felt no deformation when pushing the surface.)

(6) Perceptibility of Operation Sections (Perceptibility Between Different Grain Patterns)

The perceptibility was evaluated by rubbing the surface of the injection molded evaluation sample with a finger in a transverse direction and checking whether the finger felt a difference in leather grain depth. The perceptibility was evaluated by three people. All the evaluators were unanimous about the results.

◯: Good (The finger moving in the transverse direction clearly felt the change in leather grain depth.)

x: Poor (The location of the change in leather grain depth was imperceivable, and the finger moving in the transverse direction did not clearly feel the difference.)

(7) Comprehensive Evaluation

The compositions were evaluated considering all the evaluation results obtained above. The threshold was three points for the potential that the material would satisfy the performance required of the display device of the present invention. Better results and outstanding results were rated as four points and five points, respectively. Poor results and very bad results were rated as two points and one point, respectively.

and consequently the molded article obtained was unsatisfactory. In Comparative Example 2, the total light transmittance was low due to the large molding thickness, and consequently the sample obtained could not satisfy the required performance. In Comparative Examples 3 and 5, the MFR was low and the fluidity was poor, and consequently the samples obtained failed to have a predetermined molding thickness. In Comparative Examples 4 and 6, the hardness was so high that flexible and soft molded articles satisfying the required performance could not be obtained. From these results, the injection molded articles of Comparative Examples 1 to 6 did not qualify as practical surface films for display devices, and were evaluated as unsatisfactory considering all the evaluation results.

INDUSTRIAL APPLICABILITY

The display devices of the present invention have industrial applicability. As described hereinabove, the display

TABLE 1

| | | | | Comp. Ex. 1 | Ex. 1 | Ex. 2 | Comp. Ex. 2 | Comp. Ex. 3 | Comp. Ex. 4 | Comp. Ex. 5 | Comp. Ex. 6 | Ex. 3 | Ex. 4 | Ex. 5 |
|---|---|---|---|---|---|---|---|---|---|---|---|---|---|---|
| Components | (A) | Ethylene/α-olefin copolymers | A-1 | 60 | 60 | 60 | 60 | | | | | 60 | 50 | 60 |
| | | | A-2 | | | | | 100 | 50 | 100 | 10 | | | |
| | (B) | Hydrogenated products of block copolymers | B-1 | 30 | 30 | 30 | 30 | 10 | 10 | 10 | 10 | 30 | 30 | 30 |
| | | | B-2 | 15 | 15 | 15 | 15 | 10 | 10 | 10 | 10 | 15 | 15 | 15 |
| | | | B-3 | 70 | 70 | 70 | 70 | | | 50 | | 70 | 70 | 70 |
| | | | B-4 | | | | | | 50 | | 90 | | | |
| | (C) | Olefin resn | Homo polypropylene | 100 | 100 | 100 | 100 | 65 | 200 | 20 | 65 | 100 | 100 | 100 |
| | (D) | Softener | | 180 | 180 | 180 | 180 | 80 | 80 | 80 | 80 | 180 | 100 | 180 |
| | (E) | Polyorganosiloxane | | 10 | 10 | 10 | 10 | 6 | 6 | 6 | 6 | 1 | 10 | 10 |
| Cross-linking initiator | Organic peroxide | PERHEXA 25B | | 4 | 4 | 4 | 4 | 1 | 1 | 1 | 1 | 4 | 4 | 0 |
| Mass ratio ((A)/(B)) | | | | 34/66 | 34/66 | 34/66 | 34/66 | 83/17 | 42/58 | 83/17 | 8/92 | 34/66 | 30/70 | 34/66 |
| Evaluation | | MFR | | 220 | 220 | 220 | 220 | 20 | 35 | 5 | 35 | 220 | 35 | 35 |
| | | Shore hardness | | 75 | 75 | 75 | 75 | 68 | 95 | 45 | 92 | 75 | 78 | 70 |
| | | Injection molding thickness [mm] | | 0.2 | 0.6 | 1 | 3 | 0.6 | 0.6 | 0.6 | 0.6 | 0.6 | 1 | 1 |
| | | Total light transmittance [%] | | Fail | 5 | 4 | 0.1 | Fail | 7 | Fail | 7 | 10 | 4 | 15 |
| | | 60° Specular gloss [%] | | Fail | 2 | 2 | 2 | Fail | 3 | Fail | 3 | 2 | 2 | 10 |
| | | Soft/hard tactile sensation | | Fail | ◯ | ◯ | ◯ | Fail | x | Fail | x | ◯ | ◯ | ◯ |
| | | Perceptibility of step on operation section | | Fail | ◯ | ◯ | ◯ | Fail | ◯ | Fail | ◯ | ◯ | ◯ | ◯ |
| Comprehensive evaluation | | | | 1 | 5 | 5 | 2 | 1 | 2 | 1 | 2 | 5 | 5 | 4 |

Discussion of Evaluation Results

As described in Table 1, the injection molded articles obtained from the thermoplastic elastomer compositions of Examples 1 to 5 were excellent in fluidity, flexibility, total light transmittance, soft/hard tactile sensation and perceptibility of operation sections, and were thus shown to sufficiently satisfy the performance required of the display devices of the present invention. The comprehensive evaluations thereof were also good.

In Comparative Example 1, the injection molding thickness was small and the predetermined area was not filled, devices of the present invention may be used by being incorporated into interior members for vehicles such as automobiles, and may also be used as part of the interiors in the inside of buildings (such as office buildings, hotels, stores and general houses). Further, the display devices of the present invention may be used in any kinds of applications including liquid crystal televisions, lighting switches, bathroom monitors, furniture, audio equipment, speakers and home appliances (such as rice cookers, microwave ovens, washing machines, air conditioner panels, telephones and remote controllers).

REFERENCE SIGNS LIST

1 VEHICLE DATA DISPLAY SECTION
2 CAR NAVIGATION SYSTEM DISPLAY SECTION
3 RECEIVED DATA DISPLAY SECTION
4 MONITOR
5 HAZARD LAMP SWITCH
6 AIR CONDITIONER SWITCH
7 WARNING DISPLAY SECTION
8 WINDOW OPENING/CLOSING SWITCH
9 DOOR LOCK SWITCH
10 DECORATIVE AND LIGHTING PANEL
11 OPERATION PANEL
12 AIR OUTLET
100 DISPLAY ELEMENT
101 SURFACE FILM

The invention claimed is:

1. A display device comprising a display element including a light source, and a surface film disposed so as to overlap with the display element and comprising a thermoplastic elastomer composition, wherein the surface film has a step at a position where the display element is attached, the thermoplastic elastomer composition satisfying conditions (1) and (2) below, the surface film satisfying conditions (3) and (4) below:
 (1) the melt flow rate (ASTM D1238, 230° C., 2.16 kg load; MFR) is not less than 30 g/10 min;
 (2) the type A hardness (momentary value) measured by a method in accordance with JIS K6253 is 60 to 90;
 (3) the thickness is not less than 300 μm and not more than 1.5 mm;
 (4) the total light transmittance measured by a method in accordance with JIS K7361 is 3 to 60%.

2. The display device according to claim 1, wherein the thermoplastic elastomer composition is a thermoplastic elastomer composition comprising components (A) to (C) below:
 (A) an ethylene/α-olefin copolymer comprising ethylene units and C3-C20 α-olefin units;
 (B) a hydrogenated product of a block copolymer comprising at least one block principally comprising conjugated diene monomer units and at least one block principally comprising vinyl aromatic monomer units; and
 (C) an olefin resin other than the component (A).

3. The display device according to claim 2, wherein the mass ratio ((A)/(B)) of the component (A) to the component (B) is 20/80 to 75/25, and the content of the component (C) is 20 to 150 parts by mass relative to the total of the contents of the component (A) and the component (B) taken as 100 parts by mass.

4. The display device according to claim 1, wherein the thermoplastic elastomer composition is a crosslinked thermoplastic elastomer composition.

5. The display device according to claim 1, wherein the thermoplastic elastomer composition further comprises a softener (D).

6. The display device according to claim 1, wherein the thermoplastic elastomer composition further comprises a polyorganosiloxane (E).

7. The display device according to claim 1, wherein the surface film is obtained by injection molding the thermoplastic elastomer composition.

8. The display device according to claim 1, wherein the surface film is grained with irregularities including larger irregularities having a height difference of 20 μm to 500 μm and smaller irregularities having a height difference of 1 μm to 10 μm.

9. The display device according to claim 1, wherein the surface film has a specular gloss at 60° of not more than 5% as measured by a method in accordance with JIS Z8741.

10. A vehicle interior member comprising the display device of claim 1 that is incorporated in the vehicle interior member.

* * * * *